(12) United States Patent
Roote et al.

(10) Patent No.: US 6,241,278 B1
(45) Date of Patent: Jun. 5, 2001

(54) VEHICLE HAVING A ROOF MOUNTED INFLATABLE CUSHION

(75) Inventors: Andrew Roote, Kenilworth; Iain Raymond Jones, Solihull; Jason John Grey, Glos; Rachel Kenyon, Leics; Trevor Anthony Flavell, Wolverhampton, all of (GB)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/564,614

(22) Filed: May 4, 2000

(30) Foreign Application Priority Data

May 5, 1999 (GB) .................................................. 9910382

(51) Int. Cl.⁷ .................................................. B06R 21/22
(52) U.S. Cl. .................................. 280/730.2; 280/730.1; 280/728.2; 280/749
(58) Field of Search ............................ 280/730.2, 730.1, 280/728.2, 728.1, 749; 296/210, 211, 214

(56) References Cited

U.S. PATENT DOCUMENTS

| 2,806,737 | * | 9/1957 | Maxwell | 280/730.1 |
| 5,588,672 | * | 12/1996 | Karlow et al. | 280/730.2 |
| 5,795,014 | * | 8/1998 | Balgaard | 298/210 |

FOREIGN PATENT DOCUMENTS

96/07563 * 3/1995 (WO).

* cited by examiner

Primary Examiner—Eric Culbreth
(74) Attorney, Agent, or Firm—Gary A. Smith

(57) ABSTRACT

A vehicle passenger safety restraint arrangement where an inflatable cushion mounted in a vehicle roof is operatively connected to an inflator which inflates the inflatable cushion in the event of an accident. The inflator is conveniently positioned in the roof space adjacent to the front reinforcement rail and can be attached to the rail by a deformable bracket so that the inflator may move relative to the bracket to soften the impact if a passenger collides with the inflator during an accident.

12 Claims, 2 Drawing Sheets

VEHICLE HAVING A ROOF MOUNTED INFLATABLE CUSHION

FIELD OF THE INVENTION

The present invention relates to motor vehicle safety restraint apparatus, and in particular to safety restraint apparatus which protects vehicle passengers by deploying an inflatable cushion in the event of a accident.

BACKGROUND

The safety of vehicle passengers is an important consideration in the interior design of most modern automotive vehicles. When a vehicle suffers an accident, a vehicle passenger can undergo multiple collisions with the interior surfaces of the vehicle. The interior trim of the vehicle can be designed to cushion the impact of such collisions and, in addition, inflatable cushions can be provided which inflate within the interior of a vehicle in order to restrain the passengers in the event of an accident.

However, inflators used to inflate side cushions are normally mounted on a roof-supporting pillar. Since inflators are normally hard objects, this can make it difficult to design the interior trim of a pillar so that the trim will effectively absorb the energy of internal collisions.

It is known to position an inflator in the roof of a vehicle, behind the B-pillar. See, for example, WO 96/07563. The inflator is rigidly supported and, in the event of a collision of the driver's head with the roof, serious head injury may result.

SUMMARY OF THE INVENTION

The present invention provides a motor vehicle comprising a passenger compartment, a roof having a front edge and a side edge, a front reinforcement member within the roof and extending along the front edge to define an adjacent recess within the roof, an inflatable cushion disposed along the side edge to inflate downwards into the passenger compartment in the event of an accident, and an inflator to inflate the inflatable cushion, the inflator positioned adjacent to the structural member within the recess.

The inflator can therefore conveniently be positioned in the space created in many vehicles by the presence of the front reinforcement member between the roof panel and the interior roof lining of a vehicle.

Since the inflator is not placed against a structural pillar supporting the vehicle roof, the lining of the structural pillars may be optimized to absorb the internal collisions without being constrained by taking into account the presence of an inflator.

In order to reduce the impact of a collision with a vehicle passenger, and in particular to reduce the risk of head injury, the inflator is preferably secured to the vehicle by means of a deformable member, arranged such that if a generally upward force is applied to the inflator, it will cause the inflator to move relative to the reinforcement member. Thus if a passenger collides with the inflator, as may be the case in a roll-over situation, the deformable member will deform and absorb some of the energy of the collision, thereby reducing the force of the impact.

Although the inflator may be attached to the roof panel of a vehicle, the inflator is preferably attached to the front reinforcement member for ease of attachment.

For convenience hereinafter, the invention will be described with reference to attachment of the inflator to the front reinforcement member.

The deformable member may be a bracket formed from sheet metal secured at one point to the inflator and at another point to the reinforcement member. The deformable member may for example be welded to the inflator at one end and screw mounted to the reinforcement member at the other end.

So as to make most efficient use of the recess space adjacent to the front reinforcement member, the inflator may have a long axis which is aligned substantially parallel to the front reinforcement member. The inflator may be cylindrical, or any other elongate shape which can conveniently fit in the recess space.

In a preferred embodiment, the inflator is operatively connected to the inflatable cushion via a tube smoothly curving though approximately 90 degrees, the tube being aligned with the axis of the cylinder at one end and with a side edge of the vehicle roof at the other end. The curved tube allows the folded cushion and the inflator to be aligned generally perpendicular to one another, the smoothness of the curvature being important to reduce the sudden transfer of momentum of fast flowing gas to the tube.

BRIEF DESCRIPTION OF THE DRAWINGS

The invention will now be further described, by way of example, with reference to the accompanying drawings, in which.

DETAILED DESCRIPTION OF THE PREFERRED EMBODIMENT

Figure 1:
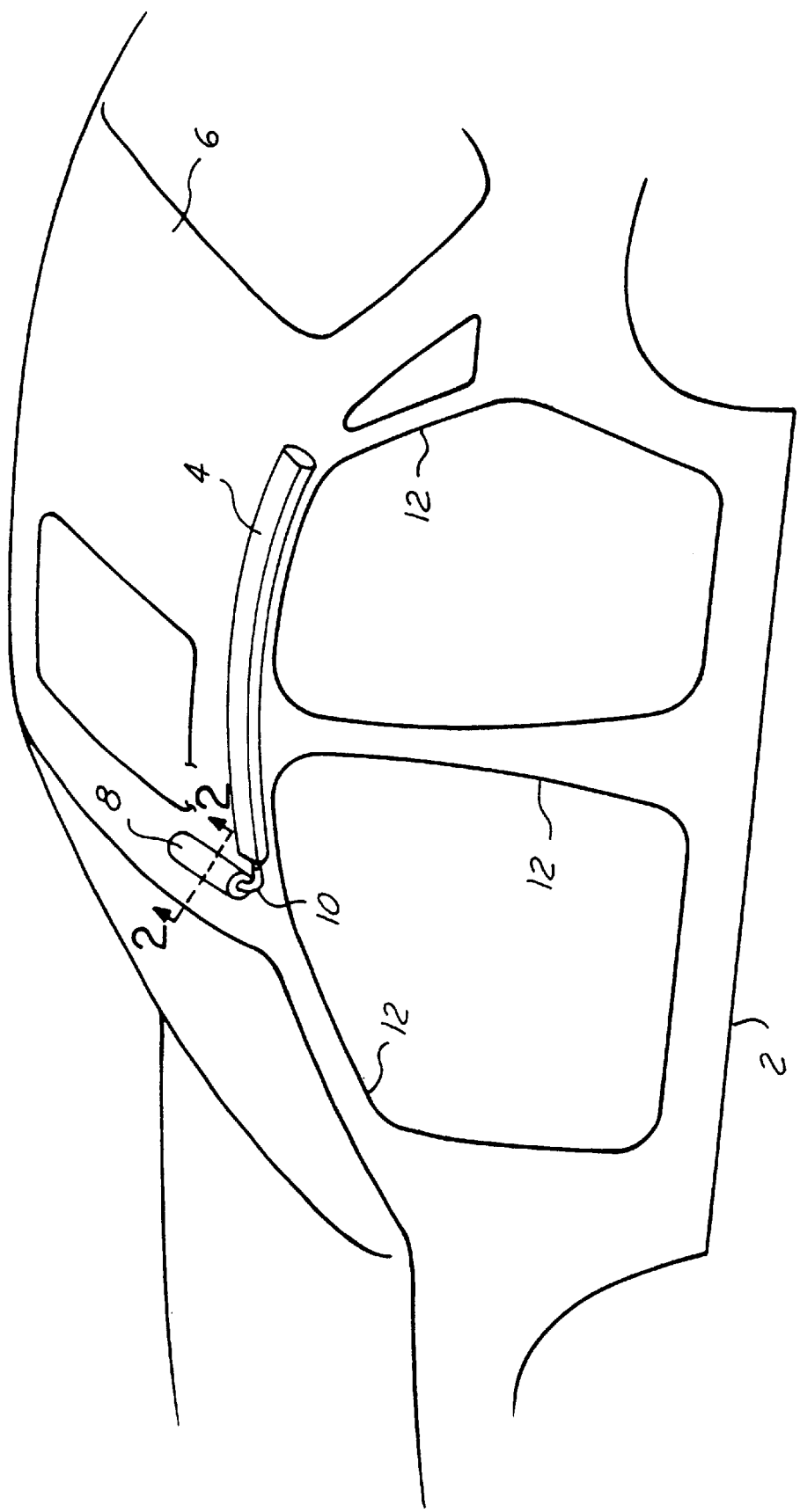
FIG. 1 shows a perspective view of part of the body of a vehicle with an inflatable cushion and an inflator according to the invention.

In FIG. 1, a vehicle body 2 is shown where an inflatable cushion 4 in the uninflated state is folded up along a line running close to a side edge of the roof 6. The inflatable cushion 4 is operatively connected to an inflator 8 by a rigid tube 10 which curves through approximately 90 degrees.

In the event of an accident, the inflator 8 forces gas into the inflatable cushion 4 which inflates in a downward direction, between an interior side of the vehicle and a vehicle passenger, the cushion helping to restrain the passenger during the accident.

The inflator 8 is cylindrical in shape, typically 20 cm long with a diameter of 3.5 cm, and is located within the roof 6, with the long axis of the inflator 8 aligned almost parallel to the front edge of the roof. These dimensions are given by way of illustration and do not limit the invention in any way.

Since the inflator 8 is situated towards the front of the vehicle rather than on a roof supporting pillar 12, the lining of the supporting pillars 12 can be optimized to absorb the impact of a collision.

Figure 2:
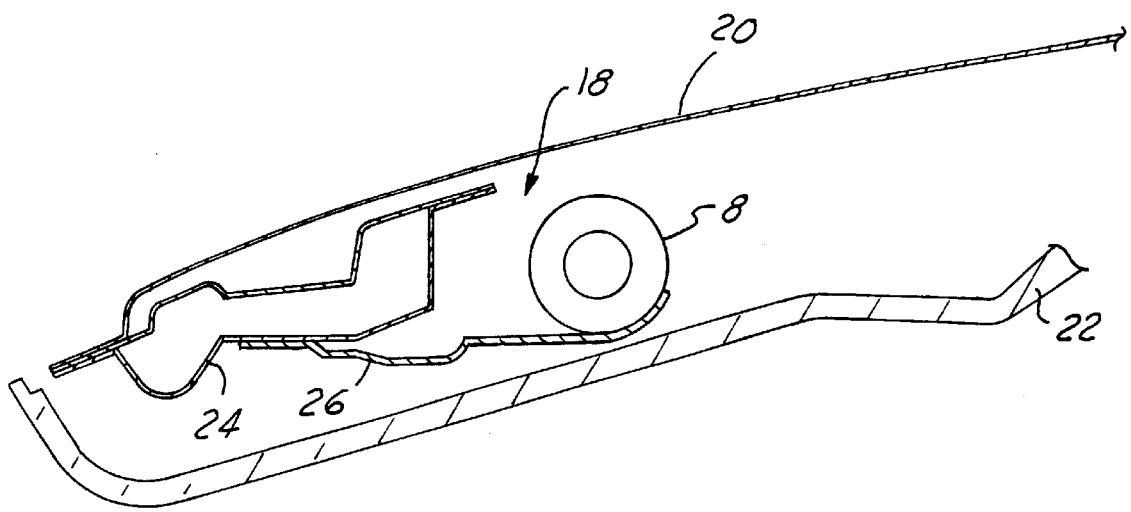
FIG. 2 shows a cross sectional view through the line 2—2 in FIG. 1.

Referring now to FIG. 2, the inflator 8 is positioned in a recess 18 between an exterior roof panel 20 and interior roof lining 22, and is attached to a front reinforcement member 24 by a deformable bracket 26.

Because of the space available in this area of the roof, the inflator 8 can be positioned some distance away from both the roof panel 20 and the reinforcement member 24, as indicated in FIG. 2. This means that in the event of an accident, the inflator 8 is not constrained by either the reinforcement member 24 or the roof panel 20, both of which are relatively inflexible in comparison to the deformable bracket 26.

If an accident occurs and the head of a passenger collides with the inflator 8, the bracket 26 will deform and allow the inflator 8 to move upwards towards the roof panel 20, thereby absorbing some of the energy of the collision and reducing the force experience by the passenger.

The deformable bracket 26 is long enough to ensure that the inflator 8 can move past the reinforcement member 24 and into contact with the roof panel 20 when a sufficiently large upward force is applied to the inflator 8. This is desirable since the roof panel 20 is more flexible than the reinforcement member 24, and will deform to some extent.

Figure 3:
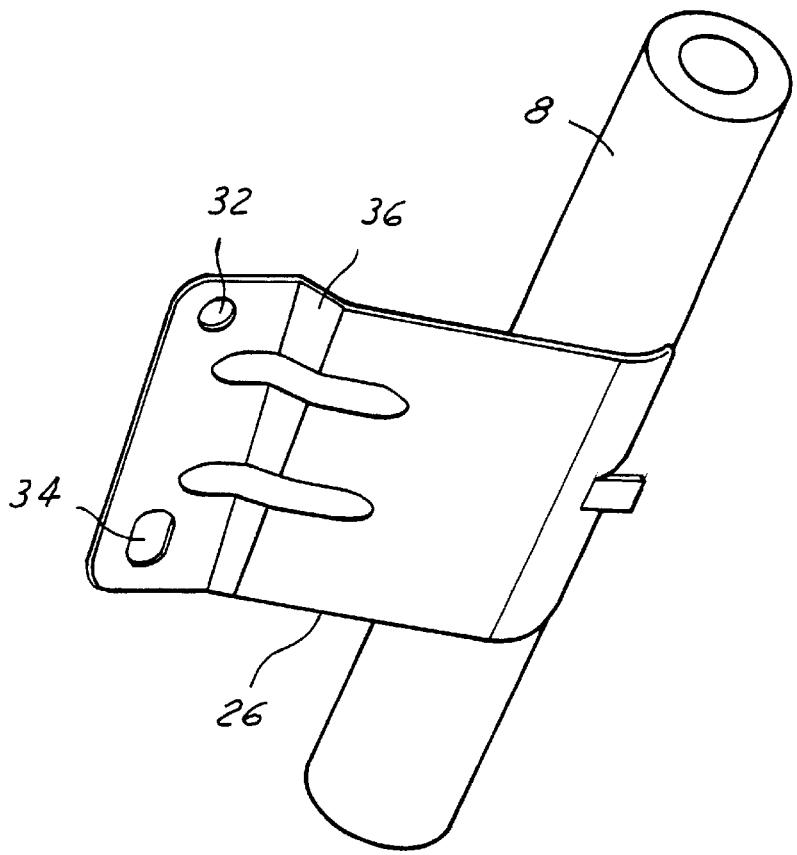
FIG. 3 shows a perspective view of an inflator with a deformable mounting bracket suitable for use in the present invention.

In FIG. 3, the deformable bracket 26 is shown welded to the inflator 8 at one end, the other end having bolt holes 32 and 34 for mounting to the reinforcement member 24. The bracket 26 is formed from a blank of sheet steel, and is shaped with a plurality of nonparallel fold lines 36 which enable the inflator 8 to be orientated with a slight downward slant in the direction of the inflatable cushion 4.

The fold lines 36 also have the effect of concentrating the stresses on the bracket 26 in the event of an impact, so that the bracket will deform in a predictable fashion.

It will thus be appreciated that the present invention provides considerable advantages in the interior safety design of vehicles, particularly in the event of passenger collisions with the inflator used for side impact inflatable cushions.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A motor vehicle comprising:
   a passenger compartment with a roof having a front edge and a side edge;
   a front reinforcement member within the roof and extending along the front edge to define an adjacent recess within the roof;
   an inflatable cushion disposed along the side edge and being arranged to inflate downwards into the passenger compartment in the event of an accident; and
   an inflator to inflate the inflatable cushion, the inflator positioned within the recess and secured to the front reinforcement member.

2. The motor vehicle according to claim 1 wherein the inflator is secured to the front reinforcement member by a deformable member.

3. The motor vehicle according to claim 2 wherein the deformable member is arranged such that a generally upward force applied to the inflator will cause the inflator to move relative to the front reinforcement member.

4. The motor vehicle according to claim 2 where the deformable member is a bracket formed from sheet metal secured at one point to the inflator and at another point to the front reinforcement member.

5. The motor vehicle according to claim 2 wherein the deformable member has a plurality of fold lines where stress will be concentrated in the event of an impact.

6. The motor vehicle according to claim 1, wherein the inflator has a long axis which is aligned substantially parallel to the front reinforcement member.

7. The motor vehicle according to claim 6, wherein the inflator is operatively connected to the inflatable cushion via a tube curving through approximately 90 degrees.

8. A motor vehicle comprising:
   a passenger compartment with a roof having a front edge and a side edge;
   a front reinforcement member within the roof and extending along the front edge to define an adjacent recess within the roof;
   an inflatable cushion disposed along the side edge and being arranged to inflate downwards into the passenger compartment in the event of an accident;
   an inflator to inflate the inflatable cushion, the inflator positioned adjacent to the front reinforcement member within the recess;
   a bracket having a first end attached to the inflator and a second end attached to the front reinforcement member, the bracket deformable such that a generally upward force applied to the inflator will cause the inflator to move relative to the front reinforcement member.

9. The motor vehicle according to claim 8 where the bracket is formed from sheet metal.

10. The motor vehicle according to claim 8 wherein the bracket has a plurality of fold lines where stress will be concentrated in the event of an impact.

11. The motor vehicle according to claim 8, wherein the inflator has a long axis which is aligned substantially parallel to the front reinforcement member.

12. The motor vehicle according to claim 11, wherein the inflator is operatively connected to the inflatable cushion via a tube curving through approximately 90 degrees.

* * * * *